US009324238B2

(12) United States Patent
Stayton et al.

(10) Patent No.: US 9,324,238 B2
(45) Date of Patent: Apr. 26, 2016

(54) DYNAMIC COLLISION AVOIDANCE SYSTEMS AND METHODS

(75) Inventors: Gregory T. Stayton, Peoria, AZ (US); Charles C. Manberg, Peoria, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 107 days.

(21) Appl. No.: 13/109,867

(22) Filed: May 17, 2011

(65) Prior Publication Data

US 2011/0282582 A1 Nov. 17, 2011

Related U.S. Application Data

(60) Provisional application No. 61/345,280, filed on May 17, 2010.

(51) Int. Cl.
*G06F 17/10* (2006.01)
*G06F 7/00* (2006.01)
*G08G 1/00* (2006.01)
*G08G 5/00* (2006.01)

(52) U.S. Cl.
CPC ............ *G08G 5/0078* (2013.01); *G08G 5/0008* (2013.01)

(58) Field of Classification Search
USPC ............................... 340/961; 701/9, 117, 301
See application file for complete search history.

(56) References Cited

U.S. PATENT DOCUMENTS

| | | | | |
|---|---|---|---|---|
| 5,839,080 | A * | 11/1998 | Muller et al. | 701/9 |
| 6,271,768 | B1 * | 8/2001 | Frazier et al. | 340/961 |
| 6,785,594 | B1 * | 8/2004 | Bateman et al. | 701/9 |
| 7,747,360 | B2 * | 6/2010 | Canu-Chiesa et al. | 701/3 |
| 8,060,295 | B2 * | 11/2011 | Estkowski et al. | 701/120 |
| 8,160,755 | B2 * | 4/2012 | Nichols et al. | 701/3 |
| 2004/0111192 | A1 * | 6/2004 | Naimer et al. | 701/9 |
| 2005/0219113 | A1 | 10/2005 | Rowlan | |
| 2006/0080008 | A1 * | 4/2006 | Ishihara et al. | 701/4 |
| 2006/0167618 | A1 * | 7/2006 | Werback | 701/120 |
| 2007/0139252 | A1 * | 6/2007 | Barry et al. | 342/29 |
| 2008/0109163 | A1 * | 5/2008 | Stone et al. | 701/211 |

(Continued)

FOREIGN PATENT DOCUMENTS

FR 2936344 A1 3/2010

OTHER PUBLICATIONS

A. Pritchett, B. Carpenter, K. Asari, J. Kuchar and R.J. Hansman, "Issues in Airborne Systems for Closely-Spaced Parallel Runway Operations," AIAA/IEEE Fourteenth Digital Avionics Systems Conference Cambridge, MA, Nov. 1995.

(Continued)

*Primary Examiner* — Thomas G Black
*Assistant Examiner* — Tyler Paige
(74) *Attorney, Agent, or Firm* — Allen J. Moss; Squire Patton Boggs (US) LLP

(57) ABSTRACT

The use of dynamic collision avoidance parameters in connection with automatic dependent surveillance, broadcast, as well as for other purposes in systems and methods may assist collision avoidance and/or advisory systems in properly identifying intruders for reporting to pilots. For example, a method can include monitoring for a triggering event with respect to at least one of geographic coordinates and a flight path of an aircraft. The method can also include detecting the triggering event. The method can further include altering at least one characteristic of at least one of a traffic alerting system and an advisory system based on detecting the triggering event.

24 Claims, 6 Drawing Sheets

Closely Spaced Parallel Approach

(56) References Cited

U.S. PATENT DOCUMENTS

| | | | | |
|---|---|---|---|---|
| 2009/0082954 | A1* | 3/2009 | Ridenour, II | 701/206 |
| 2009/0319105 | A1* | 12/2009 | Conner et al. | 701/16 |
| 2012/0150423 | A1* | 6/2012 | Khatwa et al. | 701/117 |

OTHER PUBLICATIONS

International Search Report and Written Opinion of the International Searching Authority for related application PCT/US2011/036876 mailed on Sep. 27, 2011.

* cited by examiner

Figure 1, Closely Spaced Parallel Approach

Figure 2, Turn On To Final Approach

Figure 3, Closely Spaced Parallel Approach With Linear Parameter Change When Coupled Figure 4, Turn On To Final Approach With Modified Warning Time When Coupled

DYNAMIC COLLISION AVOIDANCE SYSTEMS AND METHODS

CROSS REFERENCE TO RELATED APPLICATIONS

This application is related to and claims the priority of U.S. Provisional Patent No. 61/345,280, filed May 17, 2010, the entire content of which is hereby incorporated herein by reference.

BACKGROUND

1. Field

The use of dynamic collision avoidance parameters in connection with automatic dependent surveillance, broadcast, as well as for other purposes in systems and methods may assist collision avoidance and/or advisory systems in properly identifying intruders for reporting to pilots.

2. Description of the Related Art

Traffic Collision Avoidance System (TCAS) Resolution Advisory (RA) and Traffic Advisory (TA) nuisance alerts can occur in conventional Air Traffic Control (ATC) controlled airspace. See RTCA DO-185B, which is incorporated by reference, for TCAS Minimum Operational Performance Standards (MOPS) and for information on how TCAS functions. TCAS nuisance alerts may occur with even greater frequency due to the closer spacing afforded by Federal Aviation Administration (FAA) mandated Automatic Dependent Surveillance—Broadcast (ADS-B) equipped airplanes that provide more efficient use of the airspace. See RTCA DO-260B, which is incorporated by reference, for ADS-B System Minimum Operational Performance Standards and for information on how ADS-B functions.

SUMMARY

According to certain embodiments, a method includes monitoring for a triggering event with respect to at least one of geographic coordinates and a flight path of an aircraft. The method also includes detecting the triggering event. The method further includes altering at least one characteristic of at least one of a traffic alerting system and an advisory system based on detecting the triggering event.

A system according to certain embodiments includes at least one processor and at least one memory including computer program instructions. The at least one memory and computer program instructions are configured to, with the at least one processor, cause the apparatus at least to monitor for a triggering event with respect to at least one of geographic coordinates and a flight path of an aircraft. The at least one memory and computer program instructions are also configured to, with the at least one processor, cause the apparatus at least to detect the triggering event. The at least one memory and computer program instructions are further configured to, with the at least one processor, cause the apparatus at least to alter at least one characteristic of at least one of a traffic alerting system and an advisory system based on detecting the triggering event.

According to certain embodiments, a non-transitory computer-readable medium encoded with computer instructions that, when executed in hardware perform a process. The process includes monitoring for a triggering event with respect to at least one of geographic coordinates and a flight path of an aircraft. The process also includes detecting the triggering event. The process further includes altering at least one characteristic of at least one of a traffic alerting system and an advisory system based on detecting the triggering event.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
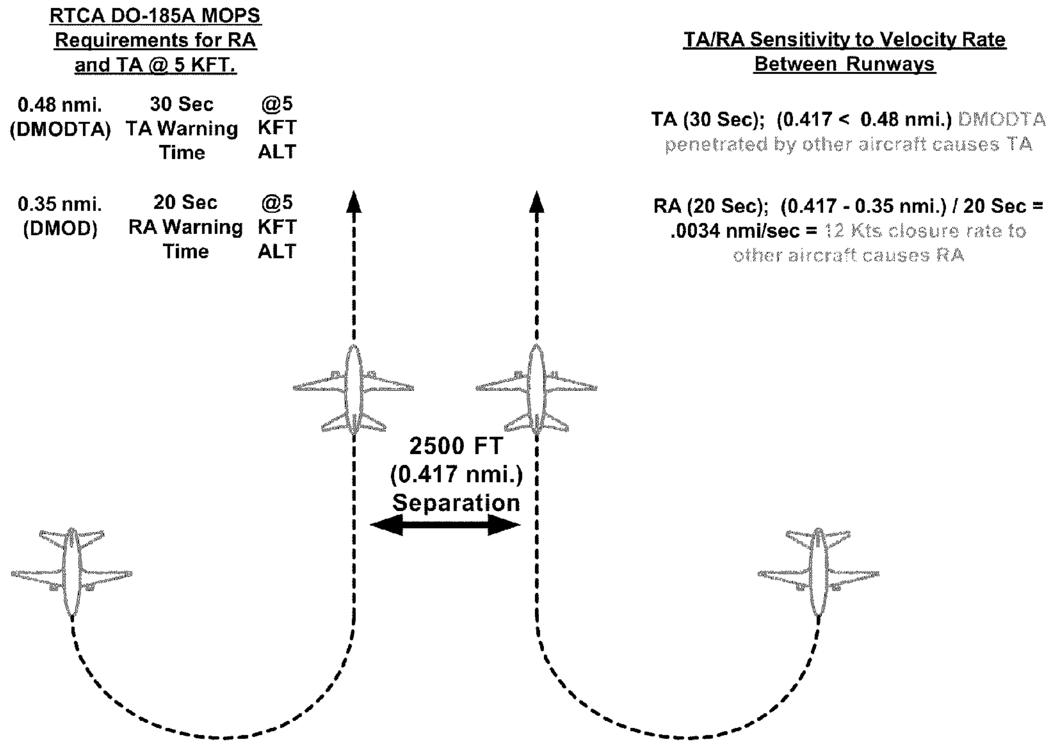
FIG. 1 illustrates a closely spaced parallel approach.
Figure 2:
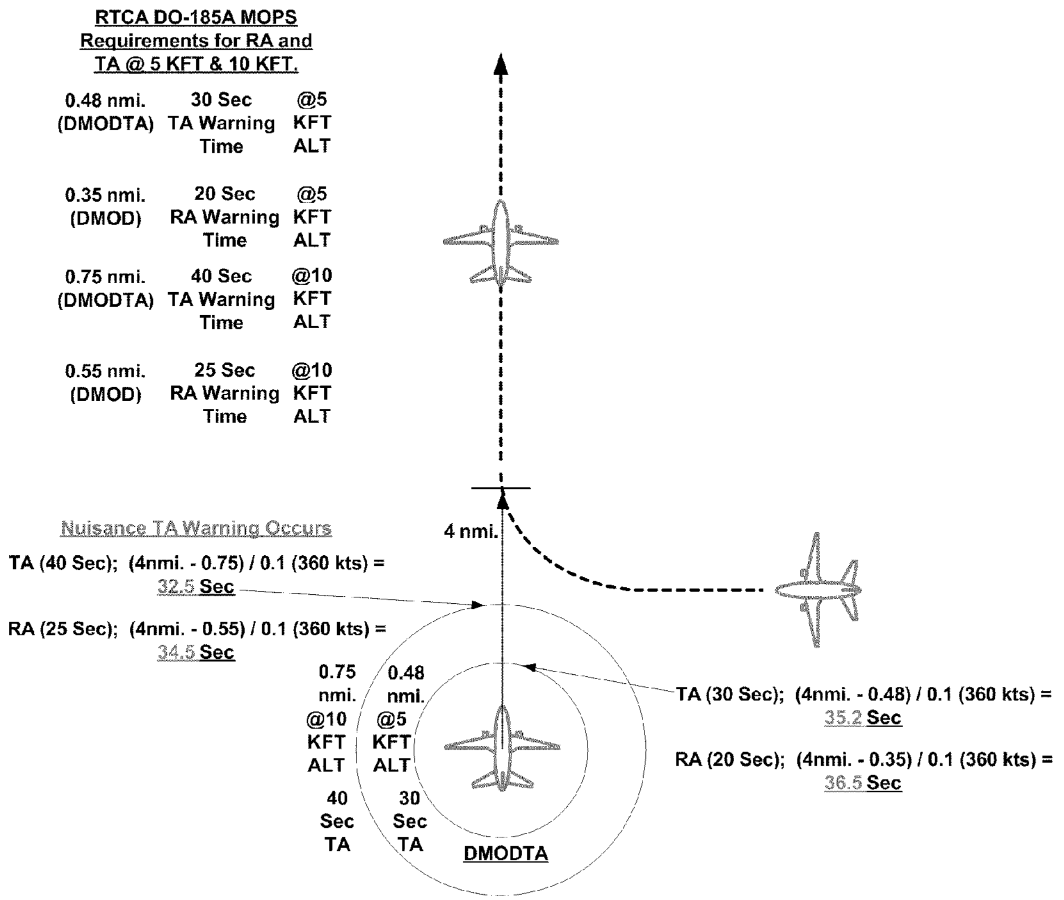
FIG. 2 illustrates a turn onto final approach.

FIGS. 1 and 2 illustrate how TCAS nuisance Traffic Advisories (TA) and Resolution Advisories (RA) can occur due to the geometry of approaches into an airport. A TA is a cautionary advisory provided to the flight crew as a precursor alert to an RA. An RA is a warning advisory to the flight crew to maneuver due to an impending near miss or collision with another aircraft.

DMOD (Distance Modification) relates to the protection volume for an RA when penetrated or predicted to be penetrated within a predetermined period of time which will cause an RA alert to be issued. TCAS RA's are advisories to maneuver the aircraft in a vertical climb or descend sense. An RA nuisance alert can be hazardous on approach for landing, if it is followed by the flight crew and own aircraft is maneuvered unnecessarily, due to close spacing between aircraft.

DMODTA (DMOD for TA) relates to the protection volume for a TA when penetrated or predicted to be penetrated within a predetermined period of time which will cause a TA alert to be issued.

Both relative range and relative altitude between each aircraft can be similarly used to calculate and issue an alert. Both range and altitude criteria for an alert must be met before a TCAS alert is issued. For simplification, in example FIGS. 1-4, it is assumed that the altitude between the two aircraft is only a small relative difference (and thus are already within the vertical protection volume for causing an alert) since both aircraft are on similar flight paths into the airport.

FIG. 1 shows how closely-spaced parallel approaches can cause TCAS nuisance alerts since small velocity variations laterally between the two aircraft, as well as approaching velocities along the intended flight path, can lead to TCAS nuisance alerts. As represented in FIG. 1, a nuisance TA is constantly being issued since the relative range between parallel aircraft is smaller than the DMODTA protection volume. Also shown is that a small closure rate velocity of only 12 knots can cause a nuisance RA. Relevant calculations are shown in FIG. 1.

For example, FIG. 1 shows that when planes are on parallel approach with a horizontal separation of 2500 ft., TCAS may determine that the other aircraft has penetrated the DMODTA. Additionally, even with a DMOD of 0.35 nmi, a closure rate of 12 kts can trigger TCAS to issue an RA.

FIG. 2 shows how a "turn-to-final" approach can put two aircraft on a temporary collision path prior to merging with the required spacing. Similarly, FIG. 1 shows that turning towards the runway for a parallel approach can also then lead to TCAS nuisance alerts. As represented in FIG. 2, for a relative closure rate between two aircraft of 360 knots (0.1 nautical mile per second) a TA can be generated when between 5000 and 10000 feet altitude. A TA is also nearly generated (misses by 5 seconds of time to penetration of DMODTA) when at or below 5000 feet. Relevant calculations are shown in FIG. 2.

The time boundaries (for example, 40 seconds for a TA between 5000 and 10000 ft. or 30 seconds for a TA at or below 5000 ft.) can be referred as the tau boundaries. There can be different tau boundaries for TAs and RAs respectively at a given altitude (for example, below 5000 ft., the tau for TA may be 30 seconds, whereas the tau for RA may be 20 seconds). Likewise the DMODTA and DMOD values may be different (0.48 miles and 0.35 miles respectively below 5000 ft.).

Appropriate dynamic adaptive TCAS Collision Avoidance System (CAS) processing can be added to any desired CAS logic to reduce RA and TA nuisance alerts. Integration of any desired ADS-B data elements, such as flight path information and intent information, may make it possible for a TCAS Collision Avoidance System (CAS) to be improved in a number of ways including reducing or eliminating nuisance alerts.

Figure 3:
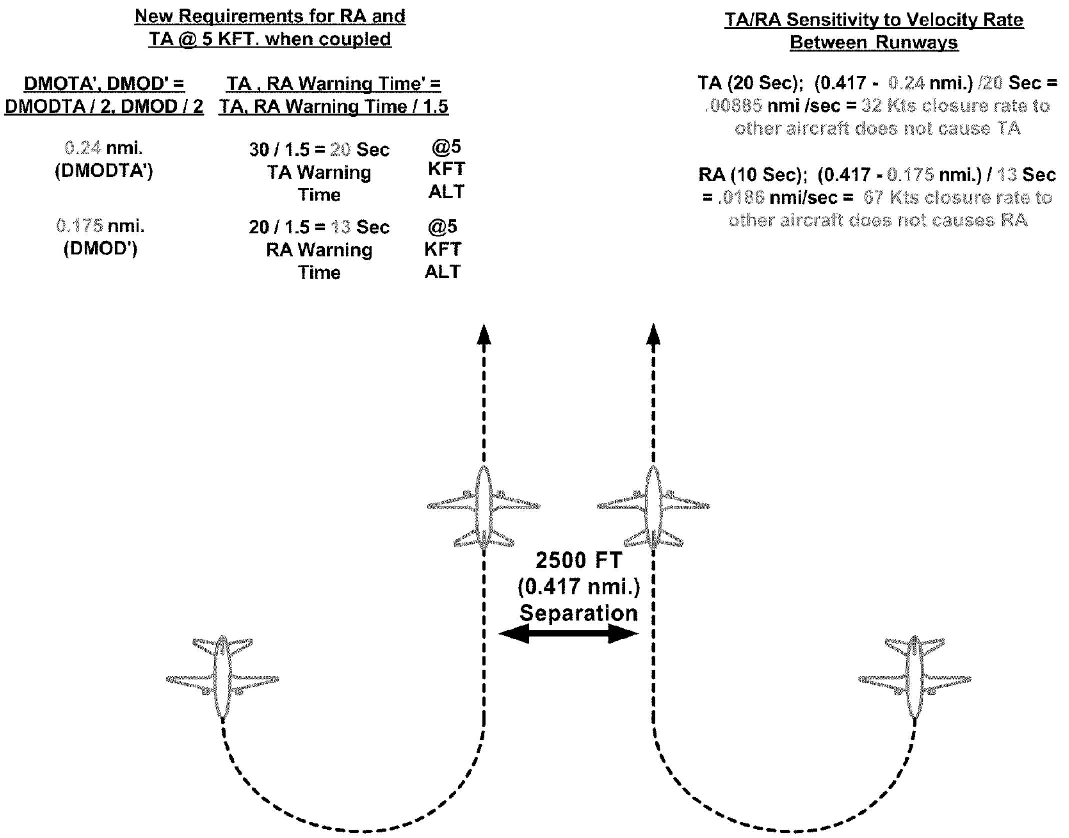
FIG. 3 illustrates a closely spaced parallel approach according to certain embodiments of the present invention.
Figure 4:
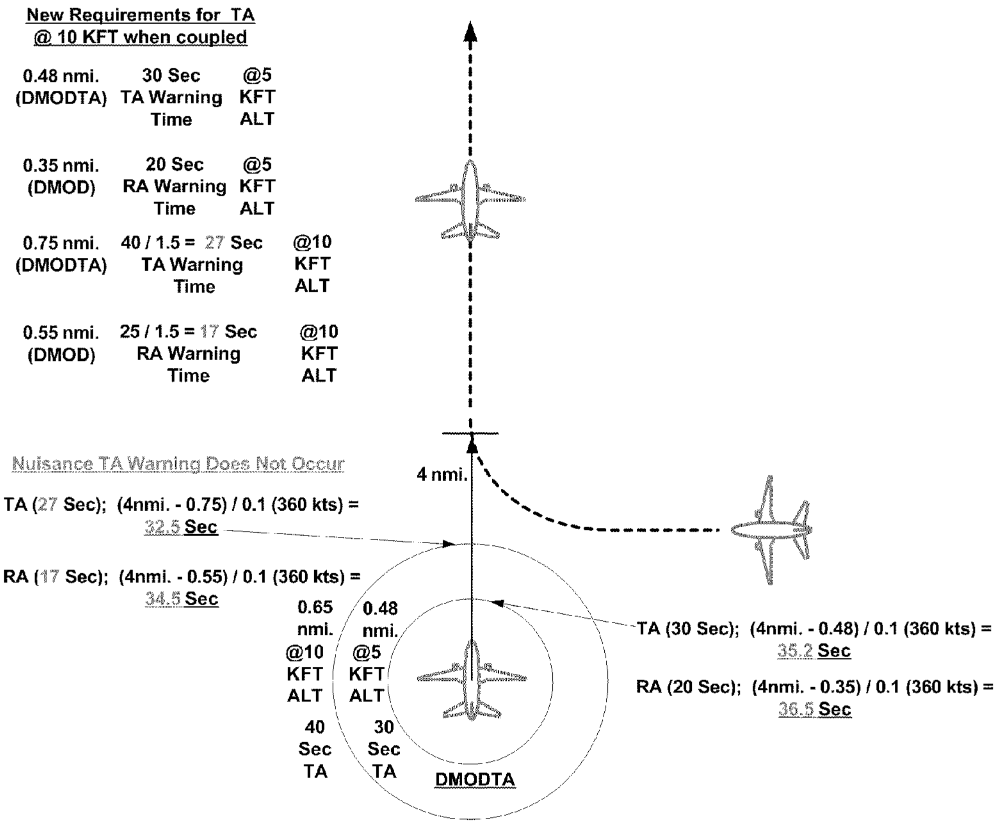
FIG. 4 illustrates a turn onto final approach according to certain embodiments of the present invention.

Certain embodiments of the present invention may use cross-linked information about the status of another aircraft paired with own aircraft that may be about to turn onto final for an ADS-B paired parallel approach, as represented in FIG. 3. Certain embodiments of the present invention may use cross-linked information about the status of another aircraft that may be on a "paired-with-own-aircraft" approach path using an ADS-B interval management spacing application, as represented in FIG. 4. When another aircraft is "paired" with own aircraft, per the cross linked information, the TCAS alerting algorithms may be desensitized by dynamically changing the TCAS alerting parameters for the paired other aircraft. TCAS may still use standard TCAS parameters for all non-paired aircraft, so that standard (per DO-185A or other applicable industry standard for TCAS) TCAS protection may still be provided for other possible collision risks.

Certain embodiments of the present invention may provide for dynamic parameter changes that may reduce, for example, the DMODTA, DMOD and alert time values (also known as the tau values), as shown in FIG. 3, so that a continuous TA alert is not produced while in a paired approach. This value or values can differ based on the distance between parallel runways, as may be contained in an airport data base, or could be calculated as a difference in expected flight path relative ranges between the two aircraft. Each aircraft's flight path can be provided to the other aircraft and/or compared against an own aircraft's airport database for a possible valid runway versus the other aircraft's position, or other validation criteria as a further check of what each aircraft believes its flight path should be for the ADS-B application it is using. If any discrepancy is discovered between own aircraft and the other aircraft that could lead to any unsafe operation, then the TCAS alerting parameters could default back to the normal standard values. For example, if a discrepancy is discovered between what own aircraft believes is the proper flight paths, and what the other aircraft is reporting then the TCAS alerting parameters could default back to the normal standard values.

Similarly any parameters could be adjusted to make the TCAS system less sensitive to other aircraft, and may be adjusted when the other aircraft passes a set of validation criteria.

Certain embodiments of the present invention may delay an alert, as an example, to try to give the other aircraft's flight crew time to adjust their spacing to own aircraft during an interval management ADS-B function, so that the TCAS alert does not occur for normal flight crew control inputs. The ADS-B interval management function might also be made to be more compatible with TCAS by preventing side-by-side aircraft geometries, using a lateral spacing algorithm, as an example, affording more distance between paired aircraft, so that TCAS would only be alerting for paired aircraft that are not properly maintaining the spacing interval of the ADS-B application. Aircraft with ADS-B applications that try to prevent side-by-side geometries with coupled aircraft could also cross link that information to the TCAS system so that it can delay its alerts, as previously described.

FIGS. 3 and 4 depict a modified set of TCAS alerting parameters that can avoid the nuisance alerts exemplified by the cases shown in FIGS. 1 and 2. The parameter modification values are merely exemplary, and therefore, in practice other values can be used. The values can be examined within or outside industry to provide alternative desired set(s) of values. However, any set of values from an equation or table, for example, may cause the TCAS collision avoidance logic to be dynamically changed as a function of ADS-B or any other desired application or applications (whether coupled or not) in use to provide TCAS interoperability.

Figure 5:
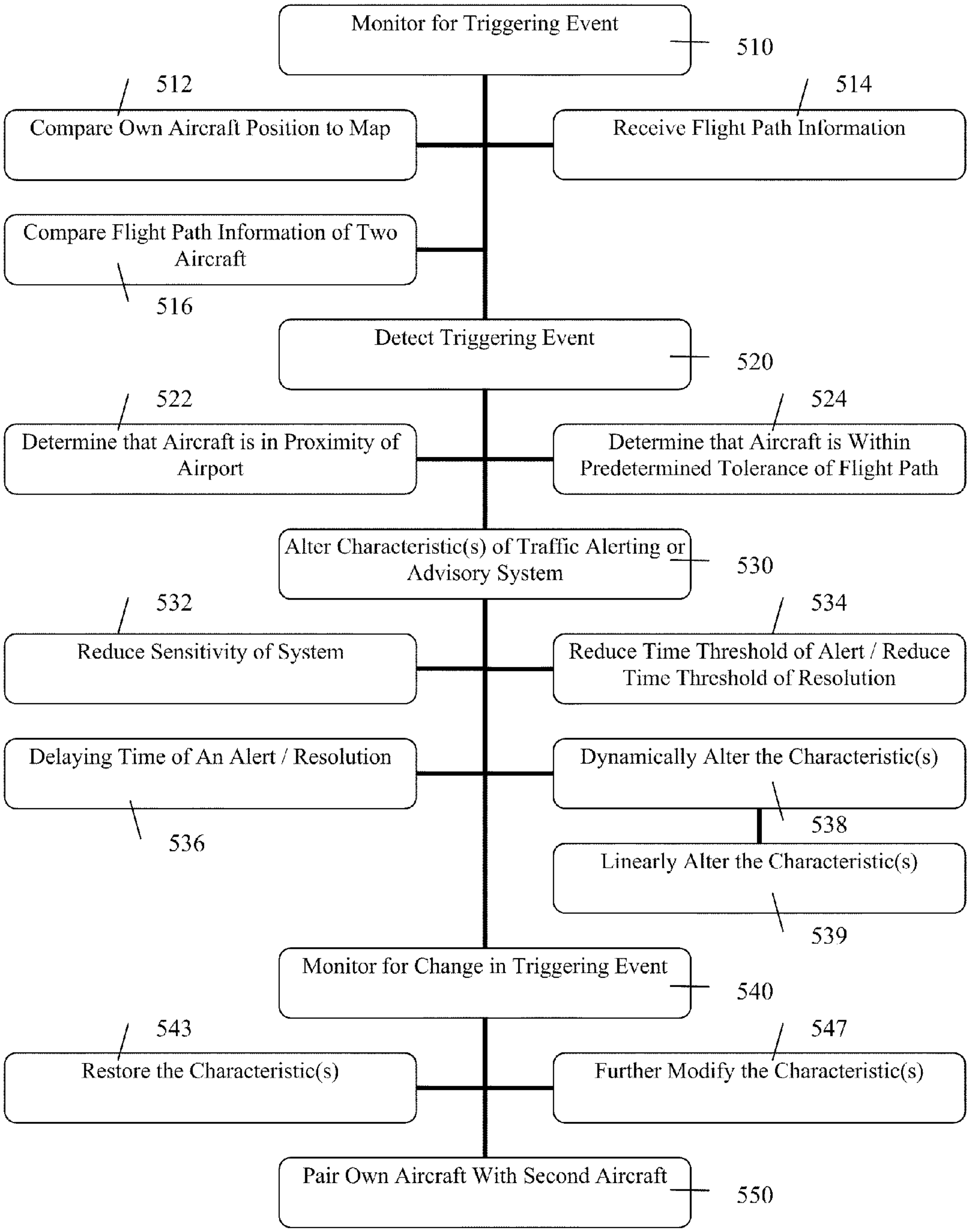
FIG. 5 illustrates a method according to certain embodiments of the present invention.

FIG. 5 illustrates a method according to certain embodiments of the present invention. As shown in FIG. 5, a method can include, at 510, monitoring for a triggering event with respect to at least one of geographic coordinates and a flight path of an aircraft.

The monitoring can include, at 512, comparing an own aircraft position to a map. For example, an own aircraft position can be determined according to global positioning system (GPS) data and the own aircraft position can be checked to determine whether it corresponds to a region that includes an airport. This check may be performed contingent on the aircraft being below some predetermined flight level, such as below 10,000 ft. or below 5,000 ft. The check may further determine whether the aircraft is performing, or has recently performed, a climbing or descending maneuver, and may handle such maneuvers differently.

The monitoring can also include, at 514, receiving the flight path of the aircraft from the aircraft. In other words, an own aircraft can receive the flight path of another aircraft, or the own aircraft can receive its own flight path data. If an own aircraft knows that it itself is performing a landing maneuver, this can trigger a change in the sensitivities of the TCAS system. Alternatively, if an own aircraft knows a flight path of another aircraft, it can use this flight path information to alter the sensitivities of the TCAS system. For example, if the other aircraft is performing a planned maneuver, the own aircraft can take the path and speed of this maneuver into account, and can trigger a TA or RA only if the other aircraft's path is unacceptable or the other aircraft has deviated more than a set amount from the path.

The monitoring can further include, at 516, comparing an own aircraft flight path to the flight path of a second aircraft. For example, if an own aircraft flight path indicates landing at a first runway, and if the other (e.g. the second) aircraft's flight path indicates landing at a second, parallel runway, the sensitivities of the TCAS system can be reduced to take this into account.

The method can also include, at 520, detecting the triggering event. The detecting can include, at 522, determining that an own aircraft is within a predetermined range from an airport. The predetermined range can correspond to the range used to perform a landing maneuver. The detecting can include, at 524, determining that the aircraft is within a predetermined tolerance from the aircraft's intended flight path.

In certain embodiments the detection can be the result of manual selection of an aircraft from a menu of aircraft or by touching a touch-screen of a display. In such a case, the system may trigger a reduction of sensitivity (or a heightening of sensitivities) with respect to that particular aircraft that has been selected. The selection can be manually made by, for example, the pilot.

The method can further include, at 530, altering at least one characteristic of at least one of a traffic alerting system and an advisory system based on detecting the triggering event.

The altering the at least one characteristic can include, at 532, reducing a sensitivity of the traffic alerting system or the advisory system. The sensitivity can be reduced on a global basis or with respect to a particular aircraft. For example, if formation flying is to be performed, the sensitivity could be reduced with respect to aircraft in the formation, but not with respect to other aircraft. Similarly, in the case of a parallel landing, the sensitivity could be reduced with respect to the aircraft landing in parallel, but not with respect to other aircraft. The altering the at least one characteristic can include, at 534, reducing a time threshold of an alert or reducing a time threshold of a resolution, or both. The altering the at least one characteristic can include, at 536, delaying a time of an alert or a resolution or both.

The altering the at least one characteristic can include, at 538, dynamically altering the at least one characteristic. The dynamically altering the at least one characteristic can include, at 539, altering the at least one characteristic linearly. Alternatively, the dynamic alteration can be performed on a step-wise basis. Other dynamic alterations are also permitted.

The method can further include, at 540, monitoring for a change in the triggering event and, when the triggering event terminates, at 543, restoring the at least one characteristic. Alternatively, based on an observation of a change in the triggering event, the method can include, at 547, dynamically modifying the at least one characteristic in response to a detected change.

The method can additionally include, at 550, pairing an own aircraft with a second aircraft, wherein the altering the at least one characteristic comprises altering the at least one characteristic only with respect to the second aircraft. Although this procedure is shown last in the figure, it may—as should be apparent—be performed prior to the altering of the at least one characteristic. Thus, the order of procedures shown in FIG. 5 should not be taken as limiting. The steps may be performed in other orders than those shown.

Figure 6:
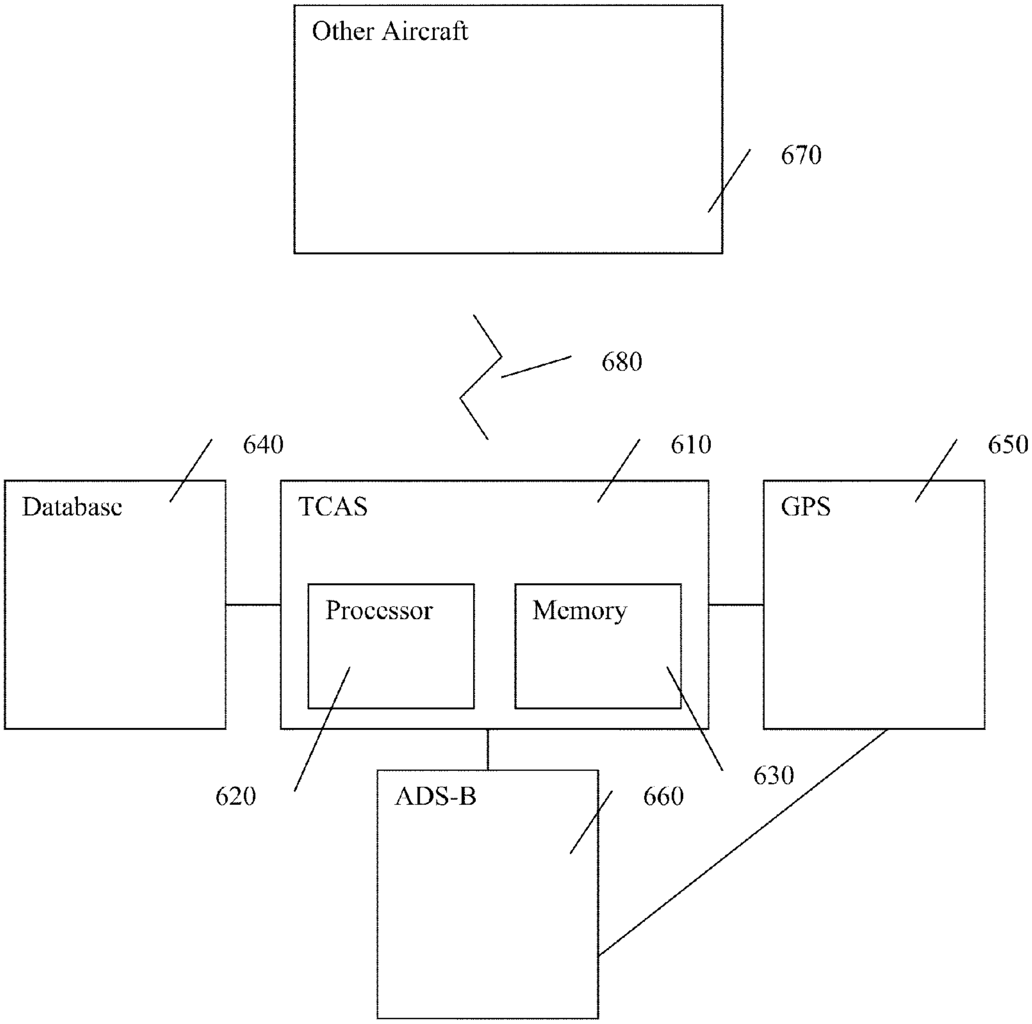
FIG. 6 illustrates a system according to certain embodiments of the present invention.

FIG. 6 illustrates a system according to certain embodiments of the present invention. As shown in FIG. 6, a system can include an own aircraft TCAS 610, or other computer system. Here TCAS 610 is taken as a general example for collision avoidance or advisory systems. The TCAS 610 can include at least one processor 620 and at least one memory 630 including computer program instructions.

The at least one processor 620 can be variously embodied by any computational or data processing device, such as a central processing unit (CPU) or application specific integrated circuit (ASIC). The at least one processor 620 can be implemented as one or a plurality of controllers.

The at least one memory 630 can be any suitable storage device, such as a non-transitory computer-readable medium. For example, a hard disk drive (HDD) or random access memory (RAM) can be used in the at least one memory 630. The at least one memory 630 can be on a same chip as the at least one processor 620, or may be separate from the at least one processor 620.

The computer program instructions may be any suitable form of computer program code. For example, the computer program instructions may be a compiled or interpreted computer program.

The at least one memory 630 and computer program instructions can be configured to, with the at least one processor 620, cause a hardware apparatus (for example, TCAS 610) to perform a process, such as the process shown in FIG. 5 or any other process described herein.

For example, the at least one memory 630 and computer program instructions can be configured to, with the at least one processor 620, cause the apparatus at least to monitor for a triggering event with respect to at least one of geographic coordinates and a flight path of an aircraft. The at least one memory 630 and computer program instructions can also be configured to, with the at least one processor 620, cause the apparatus at least to detect the triggering event. The at least one memory 630 and computer program instructions can further be configured to, with the at least one processor 620, cause the apparatus at least to alter at least one characteristic of at least one of a traffic alerting system and an advisory system based on detecting the triggering event.

Thus, in certain embodiments, a non-transitory computer-readable medium can be encoded with computer instructions that, when executed in hardware perform a process, such as one of the processes described above. Alternatively, certain embodiments of the present invention may be performed entirely in hardware.

Additionally, the TCAS 610 can be connected to other avionics or computer systems, such as a database 640, a GPS 650, an ADS-B system 660, or the like. Additionally, the TCAS 610 may communicate with a TCAS or ADS-B system of another aircraft 670 via a wireless link 680. The wireless link 680 may be a single or bi-directional radio frequency (RF) link.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

monitoring for a triggering event with respect to at least one of geographic coordinates and a flight path of an aircraft;

detecting the triggering event; and altering at least one characteristic of at least one of a traffic alerting system and a traffic advisory system based on detecting the triggering event; wherein altering the at least one characteristic of at least one of the traffic alerting system and the traffic advisory system comprises altering a sensitivity setting of at least one of the traffic alerting system and the traffic advisory system, the sensitivity setting affecting when an output is provided by at least one of the traffic alerting system and the traffic advisory system, wherein the output comprises at least one of a traffic advisory or a resolution advisory.

2. The method of claim 1, wherein the monitoring comprises comparing an own aircraft position to a map.

3. The method of claim 1, wherein the monitoring comprises receiving the flight path of the aircraft from the aircraft.

4. The method of claim 1, wherein the monitoring comprises comparing an own aircraft flight path to the flight path of a second aircraft.

5. The method of claim 1, wherein the detecting comprises determining that an own aircraft is within a predetermined range from an airport.

6. The method of claim 5, wherein the predetermined range corresponds to the range used to perform a landing maneuver.

7. The method of claim 1, wherein the detecting comprises determining that the aircraft is within a predetermined tolerance from the aircraft's intended flight path.

8. The method of claim 1, wherein the altering the at least one characteristic comprises reducing a sensitivity of the traffic alerting system or the traffic advisory system.

9. The method of claim 1, wherein the altering the at least one characteristic comprises reducing a time threshold of an alert.

10. The method of claim 1, wherein the altering the at least one characteristic comprises reducing a time threshold of a resolution.

11. The method of claim 1, wherein the altering the at least one characteristic comprises delaying a time of an alert.

12. The method of claim 1, wherein the altering the at least one characteristic comprises dynamically altering the at least one characteristic.

13. The method of claim 12, wherein the dynamically altering the at least one characteristic comprises altering the at least one characteristic linearly.

14. The method of claim 1, further comprising:
monitoring for a change in the triggering event and, when the triggering event terminates, restoring the at least one characteristic.

15. The method of claim 1, further comprising:
monitoring for a change in the triggering event and dynamically modifying the at least one characteristic in response to a detected change.

16. The method of claim 1, further comprising:
pairing an own aircraft with a second aircraft, wherein the altering the at least one characteristic comprises altering the at least one characteristic only with respect to the second aircraft.

17. A system, comprising:
at least one processor; and
at least one memory including computer program instructions,
wherein the at least one memory and computer program instructions are configured to, with the at least one processor, cause the system at least to:
monitor for a triggering event with respect to at least one of geographic coordinates and a flight path of an aircraft;
detect the triggering event; and
alter at least one characteristic of at least one of a traffic alerting system and a traffic advisory system based on detecting the triggering event; wherein altering the at least one characteristic of at least one of the traffic alerting system and the traffic advisory system comprises altering a sensitivity setting of at least one of the traffic alerting system and the traffic advisory system, the sensitivity setting affecting when an output is provided by at least one of the traffic alerting system and the traffic advisory system, wherein the output comprises at least one of a traffic advisory or a resolution advisory.

18. The system of claim 17, further comprising:
a single or bi-directional radio frequency link configured to communicate between an own aircraft and the aircraft with respect to the flight path of the aircraft.

19. The system of claim 17, wherein the at least one memory and computer program instructions are configured to, with the at least one processor, cause the system at least to monitor by at least comparing an own aircraft position to a map.

20. The system of claim 17, wherein the at least one memory and computer program instructions are configured to, with the at least one processor, cause the system at least to monitor by at least processing the flight path of the aircraft from the aircraft.

21. A non-transitory computer-readable medium encoded with computer instructions that, when executed in hardware perform a process, the process comprising:
monitoring for a triggering event with respect to at least one of geographic coordinates and a flight path of an aircraft;
detecting the triggering event; and
altering at least one characteristic of at least one of a traffic alerting system and a traffic advisory system based on detecting the triggering event; wherein altering the at least one characteristic of at least one of the traffic alerting system and the traffic advisory system comprises altering a sensitivity setting of at least one of the traffic alerting system and the traffic advisory system, the sensitivity setting affecting when an output is provided by at least one of the traffic alerting system and the traffic advisory system, wherein the output comprises at least one of a traffic advisory or a resolution advisory.

22. The non-transitory computer-readable medium of claim 21, wherein the monitoring comprises comparing an own aircraft position to a map.

23. The non-transitory computer-readable medium of claim 21, wherein the monitoring comprises receiving the flight path of the aircraft from the aircraft.

24. A method, comprising:
monitoring, by a traffic collision avoidance system, for a triggering event with respect to at least one of geographic coordinates and a flight path of an aircraft;
detecting, by the traffic collision avoidance system, the triggering event; and
altering, by the traffic collision avoidance system, at least one characteristic of at least one of a traffic alerting system and a traffic advisory system of the traffic collision avoidance system based on detecting the triggering event; wherein altering the at least one characteristic of at least one of the traffic alerting system and the traffic advisory system comprises altering a sensitivity setting of at least one of the traffic alerting system and the traffic advisory system, the sensitivity setting affecting when an output is provided by at least one of the traffic alerting system and the traffic advisory system, wherein the output comprises at least one of a traffic advisory or a resolution advisory.

* * * * *